United States Patent
Huang et al.

(10) Patent No.: US 11,174,574 B2
(45) Date of Patent: Nov. 16, 2021

(54) PLANT-EXTRACT-CONTAINING POLYESTER FIBER

(71) Applicant: SINOTECH ACADEMY OF TEXTILE (QINGDAO) CO., LTD., Qingdao (CN)

(72) Inventors: Xiaohua Huang, Qingdao (CN); Li Zhen, Qingdao (CN); Xiaoqian Huang, Qingdao (CN); Xiaolong Huang, Qingdao (CN); Yu Liu, Qingdao (CN)

(73) Assignee: SINOTECH ACADEMY OF TEXTILE (QINGDAO) CO., LTD., Qingdao (CN)

(*) Notice: Subject to any disclaimer, the term of this patent is extended or adjusted under 35 U.S.C. 154(b) by 495 days.

(21) Appl. No.: 16/086,361

(22) PCT Filed: Aug. 29, 2018

(86) PCT No.: PCT/CN2018/103019
§ 371 (c)(1),
(2) Date: Sep. 19, 2018

(87) PCT Pub. No.: WO2020/037699
PCT Pub. Date: Feb. 27, 2020

(65) Prior Publication Data
US 2020/0308730 A1  Oct. 1, 2020

(30) Foreign Application Priority Data
Aug. 22, 2018 (CN) .......................... 201810957333.1

(51) Int. Cl.
*D01F 6/92*  (2006.01)
*D01F 1/09*  (2006.01)
*D01F 1/10*  (2006.01)
*D01F 11/08* (2006.01)

(52) U.S. Cl.
CPC .................. *D01F 6/92* (2013.01); *D01F 1/09* (2013.01); *D01F 1/10* (2013.01); *D01F 11/08* (2013.01)

(58) Field of Classification Search
None
See application file for complete search history.

(56) References Cited

U.S. PATENT DOCUMENTS

2013/0203919 A1* 8/2013 You .......................... D01F 6/06
524/300

FOREIGN PATENT DOCUMENTS

| CN | 102191585 A | 9/2011 |
| CN | 102443866 A | 5/2012 |
| CN | 102766985 | * 11/2012 |
| CN | 105239201 A | 1/2016 |
| CN | 106192057 | * 12/2016 |
| CN | 108018617 | * 5/2018 |
| CN | 108048942 | * 5/2018 |
| WO | 2016068398 A1 | 5/2016 |

OTHER PUBLICATIONS

Machine Translation of CN106192057 Jiangyi (Year: 2016).*
Machine Translation of CN108018617 Longhai (Year: 2018).*
Machine Translation of CN108048942 Xinghua (Year: 2018).*
Machine Translation of CN102766985 Heng (Year: 2012).*
World Intellectual Property Organization (WIPO) International Search Report for PCT/CN2018/103019 dated May 21, 2019 6 Pages.

* cited by examiner

*Primary Examiner* — Shawn Mckinnon
(74) *Attorney, Agent, or Firm* — Anova Law Group, PLLC

(57) ABSTRACT

A plant-extract-containing polyester fiber is provided. The plant-extract-containing polyester fiber comprises raw materials including polyester chips, calcium carbide powder, cycloalkyl powder, halloysite powder, plant-extract functional additive, allyl glycidyl ether, organic acid salt, chromium sulfate, dispersing agent, surface active phospholipid, plasticized starch, chitosan, wetting agent, sodium salt of caboxy methyl cellulose, and antistatic agent.

10 Claims, No Drawings

PLANT-EXTRACT-CONTAINING POLYESTER FIBER

CROSS-REFERENCES TO RELATED APPLICATIONS

This application claims the priority of PCT Patent Application No. PCT/CN2018/103019, filed on Aug. 29, 2018, which claims priority to Chinese patent application No. 201810957333.1, field on Aug. 22, 2018, the entirety of all of which is incorporated herein by reference.

FIELD OF THE DISCLOSURE

The present disclosure generally relates to the field of synthetic fiber technology and, more particularly, relates to a plant-extract-containing polyester fiber.

BACKGROUND

Polyester is an important variety in synthetic fibers and is a trade name of polyester fibers in China. Polyester is featured with advantages such as strong durability, desired elasticity, not easy deformation, corrosion resistance, insulation, desired stiffness, easy wash and quick dry, etc. Polyester is the world's largest and most widely used variety in synthetic fibers, and occupies more than 60% of the world's production of synthetic fibers.

Plant-extract-containing polyester fiber is theoretically possible to have functions of the plant extracts and properties of polyester fiber, and, thus, has a wide application prospect. However, in actual fabrication processes, the polyester fiber mainly has following defects. The mixing of other functional materials with polyester tends to change the original properties of polyester, which directly affects the performance indicators, e.g., dry heat shrinkage rate, breaking strength, elastic elongation and wear resistance, etc., of the polyester fiber. The compatibility between functional materials is poor, which affects the functions of the functional materials. Accordingly, the application space of the polyester fiber is limited to a certain extent. Therefore, the existing formulation and fabrication method of the polyester fiber have to be urgently changed to improve the performance of the polyester fiber and to meet the diverse needs of society.

In a Chinese patent application No. CN201610591164.5, titled "marine-mud-containing skin-core composite polyester fiber and fabrication method thereof", the fiber comprises a skin layer and a core layer, and the core layer is uniformly coated in the skin layer. The skin layer comprises raw materials in percentage by weight: 80-97% of polyester chips, 2.7-18% of marine mud/plant composition, and 0.3-2% of coupling agent. The core layer comprises raw materials in percentage by weight: 95-98.5% of polyethylene terephthalate, 1.4-3.5% of Taber seed oil, and 0.1-1.5% of diisooctyldiphenylamine. The raw materials of the skin layer account for 20-60% of the total weight of the fiber; and the raw materials of the core layer account for 80-40% of the total weight of the fiber. The marine-mud-containing skin-core composite polyester fiber in such patent is mainly produced by a composite spinning process. Because the skin and core structures in the fiber produced by such method are clearly divided, the fiber is prone to fibrillation when being used, resulting in a decrease in fiber strength, poor use stability, and poor fiber wear resistance.

Therefore, it is of great significance to fabricate a polyester fiber which has desired plant functionality, desired wear resistance, desired dry heat shrinkage rate and desired breaking strength. The disclosed polyester fiber and method are directed to solve one or more problems set forth above and other problems.

BRIEF SUMMARY OF THE DISCLOSURE

One aspect of the present disclosure includes plant-extract-containing polyester fiber. The plant-extract-containing polyester fiber comprises raw materials including polyester chips, calcium carbide powder, cycloalkyl powder, halloysite powder, plant-extract functional additive, allyl glycidyl ether, organic acid salt, chromium sulfate, dispersing agent, surface active phospholipid, plasticized starch, chitosan, wetting agent, sodium salt of caboxy methyl cellulose, and antistatic agent.

In one embodiment, the plant-extract-containing polyester fiber comprises raw materials including 280-300 parts of polyester chips, 3-7 parts of calcium carbide powder, 2-6 parts of cycloalkyl powder, 2-5 parts of halloysite powder, 10-12 parts of plant-extract functional additive, 8 parts of allyl glycidyl ether, 2-6 parts of organic acid salt, 0.2 parts of chromium sulfate, 4-8 parts of dispersing agent, 9-12 parts of surface active phospholipid, 8 parts of plasticized starch, 10 parts of chitosan, 10 parts of wetting agent, 24 parts of sodium salt of caboxy methyl cellulose, and 12 parts of antistatic agent.

In one embodiment, the plant-extract-containing polyester fiber comprises raw materials including 290 parts of polyester chips, 3 parts of calcium carbide powder, 4 parts of cycloalkyl powder, 3 parts of halloysite powder, 11 parts of plant-extract functional additive, 8 parts of allyl glycidyl ether, 4 parts of organic acid salt, 0.2 parts of chromium sulfate, 6 parts of dispersing agent, 10 parts of surface active phospholipid, 8 parts of plasticized starch, 10 parts of chitosan, 10 parts of wetting agent, 24 parts of sodium salt of caboxy methyl cellulose, and 12 parts of antistatic agent.

In one embodiment, the plant-extract functional additive comprises plant extracts. The plant extracts include a grass coral extract, a wormwood extract, a snow lotus extract, and a seaweed extract with a weight ratio of approximately 5:1:1:2.

In one embodiment, the grass coral extract has a fiber content in a range of approximately ≤5.8% and an isofraxiden content of approximately 2.8%. The wormwood extract is yellow-brown powder with a fineness of 400 mesh, and has a flavonoid content in a range of approximately >28.6%. The snow lotus extract is an extract of snow lotus herb, and has a musk sputum content in a range of approximately 6.3-12.2%, a snow lotus lactone content in a range of approximately 0.1-6.8%, an alkaloid content in a range of approximately 0.1-5.0%, a volatile oil content of approximately 2.5%, and a polysaccharide content in a range of approximately 8.5-15.6%. The seaweed extract has a protein content in a range of approximately 51.4-58.3%, a seaweed iodine content in a range of approximately 2.4-9.6%, and a mannitol content in a range of approximately 1.0-10.2%. The sodium salt of caboxy methyl cellulose has an active ingredient content in a range of approximately ≥99.2%, and a pH value of approximately 8.2 in 1% aqueous suspension.

In one embodiment, the plant-extract functional additive is prepared including: dissolving lignin in sodium hydroxide solution under stirring for 12-16 minutes to be well mixed; adding glacial acetic acid until a pH value is adjusted to 2-3; adding laccase and lignin peroxidase under stirring for 3-8 minutes; raising a temperature to 30° C.-40° C. and keeping for 10 minutes-20 minutes; adjusting the pH value to 1-2 by adding the glacial acetic acid, adding ethylene diamine; and heating in a water bath for undergoing reaction for 100 minutes-150 minutes. In addition, the plant-extract functional additive is prepared including: after the reaction is completed, adjusting the pH value to 4-5 using sodium hydroxide; adding the plant extracts according to a weight ratio; mixing the plant extracts using a stirrer; and performing an ultrasonic treatment twice to evenly disperse the plant extracts. A duration of a first ultrasonic treatment is approximately 20 minutes-25 minutes, a first ultrasonic frequency is approximately 50 kHz-100 kHz, a duration of a second ultrasonic treatment is approximately 45 minutes-60 minutes, and a second ultrasonic frequency is approximately 100 kHz-120 kHz. Further, the plant-extract functional additive is prepared including: after the dispersion is completed, adding ammonium cerium nitrate; raising the temperature to 80° C.-85° C. to continue the reaction for 50 minutes-120 minutes; and washing, purifying and vacuum drying the reactant to obtain the plant-extract functional additive.

In one embodiment, an addition amount of the lignin is approximately 5-20% by weight of the plant-extract functional additive. An addition amount of the plant extracts is approximately 70-120% by weight of the lignin. An addition amount of the laccase is approximately 1.3-1.5% by weight of the lignin. An addition amount of the lignin peroxidase is approximately 0.7-1.5% by weight of the lignin. An addition amount of the ammonium cerium nitrate is approximately 0.7-2.5% by weight of the plant extracts. An addition amount of the ethylene diamine is approximately 150-200% by weight of the lignin. A temperature of the water bath is approximately 65° C.-75° C.

In one embodiment, the organic acid salt comprises sodium acetylsalicylate, sodium humate, and zinc glucosamine with a weight ratio of approximately 3:1:4. The wetting agent is a polyether-modified polydimethylsiloxane interpolymer solution with a weight percent concentration of approximately 22% in xylene solvent. The surface active phospholipid has a colour and lustre in a range of approximately <10, a pH value in a range of approximately 5.0-7.2 in 10% aqueous solution, and a solid content of approximately 41.0±1.2%. The cycloalkyl powder comprises materials in percentage by weight: $Al_2O_3$ in a range of approximately 68.06-69.00%, $SiO_2$ in a range of approximately 16.03-17.22%, $K_2O$ of approximately 1.07%, $Na_2O$ of approximately 10.06%, and $Fe_2O_3$ of approximately 0.77%.

In one embodiment, the polyester fiber is prepared including: adding chromium sulfate into organic acid salt under stirring at 95° C. for 12 minutes; cooling to 50° C.; and staring a dispersing machine and adjusting a rotation speed to 800 rad/min to obtain a component A. In addition, the polyester fiber is prepared including: putting calcium carbide powder, cycloalkyl powder, and halloysite powder into a sanding machine; starting the sanding machine for grinding at a temperature controlled below 40 $^2$C until the fineness reaches in a range of approximately ≤10 μm; and adding AGE, wetting agent and dispersing for 25 minutes to obtain a component B. Moreover, the polyester fiber is prepared including: dissolving chitosan with a molecular weight of 200,000 or less in water; sequentially adding plant-extract functional additive, surface active phospholipid, plasticized starch, sodium salt of caboxy methyl cellulose, and antistatic agent with one third of the total weight; and performing an infrared-ultrasonic treatment on such mixture to obtain a component C. Further, the polyester fiber is prepared including: heating polyester chips to a molten state; sequentially adding the component B, the component C, and the component A, and mixing; sequentially and slowly adding dispersion agent and remaining antistatic agent under stirring at 1050 rad/min-1100 rad/min for 20 minutes; and using a melt spinning method to obtain the plant-extract-containing polyester fiber.

In one embodiment, parameters of the infrared-ultrasonic treatment include an ultrasonic frequency of approximately 95 KHz and a treatment duration of approximately 25 minutes.

In one embodiment, parameters of the melt spinning method include: a temperature of approximately 272° C., a cooling temperature of side-blowing air of approximately 25° C., a speed of the side-blowing air of approximately 0.6 m/s, a roll spinning speed of approximately 4200 m/min, and a drafting ratio of approximately 4.3.

Other aspects of the present disclosure can be understood by those skilled in the art in light of the description, the claims, and the drawings of the present disclosure.

DETAILED DESCRIPTION

Embodiment 1

The present disclosure provides a plant-extract-containing polyester fiber. The plant-extract-containing polyester fiber may comprise following raw materials in percentage by weight: 280 parts of polyester chips, 4 parts of calcium carbide powder, 2 parts of cycloalkyl powder, 2 parts of halloysite powder, 10 parts of plant-extract functional additive, 8 parts of allyl glycidyl ether (AGE), 2 parts of organic acid salt, 0.2 parts of chromium sulfate, 4 parts of dispersing agent, 9 parts of surface active phospholipid, 8 parts of plasticized starch, 10 parts of chitosan, 10 parts of wetting agent, 24 parts of sodium salt of caboxy methyl cellulose (CMC-Na), and 12 parts of antistatic agent.

The organic acid salt may comprise sodium acetylsalicylate, sodium humate, and zinc glucosamine with a weight ratio of approximately 3:1:4. The wetting agent may be a polyether-modified polydimethylsiloxane interpolymer solution with a weight percent concentration of approximately 22% in xylene solvent. The surface active phospholipid may have a colour and lustre in a range of approximately <10, a pH value in a range of approximately 5.0-7.2 in 10% aqueous solution, and a solid content of approximately 41.0±1.2%. The plasticized starch may be carboxymethyl starch ether having a viscosity (5% aqueous solution, 20° C.) in a range of approximately 20100 mPa-20200 mPa.s, and a pH value (2% aqueous solution) in a range of approximately 8-10.5. The dispersing agent may comprise sodium tripolyphosphate, sodium hexametaphosphate, and sodium pyrophosphate with a weight ratio of approximately 5:7:1.

The cycloalkyl, mainly existed in a form of hollow nano-tubular morphology in nature, is a silicate mineral. The cycloalkyl powder in the present disclosure may have a whiteness of approximately 81, a whiteness in a range of approximately >91 after being calcined at 1400° C., a refractoriness in a range of approximately >1750° C., a diameter in a range of approximately 0.1 um-0.4 μm, and a length in a range of approximately <0.5 μm. The cycloalkyl powder may comprise materials in percentage by weight: $Al_2O_3$ in a range of approximately 68.06-69.00%, $SiO_2$ in a range of approximately 16.03-17.22%, $K_2O$ of approximately 1.07%, $Na_2O$ of approximately 10.06%, and $Fe_2O_3$ of approximately 0.77%.

The plant-extract functional additive may comprise plant extracts. The plant extracts may include a grass coral extract, a wormwood extract, a snow lotus extract, and a seaweed extract (sesmollient) with a weight ratio of approximately 5:1:1:2. A fabrication method of the plant-extract functional additive may include the following.

A: Lignin may be dissolved in sodium hydroxide solution under stirring for 13 minutes to be well mixed. Then, glacial acetic acid may be added until the pH value of the mixture is adjusted to 2. Moreover, laccase and lignin peroxidase may be added under stirring for 5 minutes. The temperature may be raised to 35° C. and kept for 10 minutes-20 minutes. In addition, the pH value of the mixture may be adjusted to 2 by adding glacial acetic acid. Further, ethylene diamine may be added, and the mixture may be heated in a water bath and undergo reaction for 100 minutes.

B: After the reaction is completed, the pH value of the mixture may be adjusted to 4 using sodium hydroxide. Moreover, the plant extracts may be added according to the weight ratio and may be mixed using a stirrer. In addition, an ultrasonic treatment may be performed twice to evenly disperse the plant extracts. The duration of a first ultrasonic treatment may be approximately 20 minutes, and the first ultrasonic frequency may be approximately 50 kHz. The duration of a second ultrasonic treatment may be approximately 45 minutes, and the second ultrasonic frequency may be approximately 100 kHz.

C: After the dispersion is completed, ammonium cerium nitrate may be added. Then, the temperature may be raised to 80° C., and the reaction may be continued for 60 minutes. Ultimately, the reactant may be washed, purified and vacuum dried to obtain the plant-extract functional additive.

Further, the addition amount of lignin may be approximately 12% by weight of the plant-extract functional additive. The addition amount of plant extracts may be approximately 85% by weight of the lignin. The addition amount of laccase may be approximately 1.3% by weight of lignin. The addition amount of lignin peroxidase may be approximately 1.0% by weight of the lignin.

The addition amount of ammonium cerium nitrate may be approximately 1.5% by weight of the plant extracts. The addition amount of ethylene diamine may be approximately 150% by weight of the lignin. A temperature of the water bath may be approximately 65° C.

After the lignin is modified, organic amine groups may be introduced on the surface of the lignin group, and may be grafted to the benzene ring of the lignin by ether bonds. Based on a network three-dimensional structure on the lignin surface, especially easy adsorption of plant extracts after being modified, the lignin, as a carrier of the plant extracts, may tightly combine the plant extracts and the polyester fiber. At the same time, the functionality of the lignin and the functionality of the plant extracts may be concentrated in the fabricated polyester fiber.

The grass coral extract may have a fiber content in a range of approximately 5.8%, and an isofraxiden content of approximately 2.8%. The grass coral extract may be an extract of leaves of Sarcandra glabra in Chloranthaceae and Dicotyledons, and may also be called as Sarcandra glabra extract. The grass coral extract may comprise istanbulin A, isofraxiden, fumaric acid, succinic acid, flavonoid and coumarin derivatives. The grass coral extract may have functions of treating pneumonia, acute appendicitis, acute gastroenteritis, bacillary dysentery, rheumatic pain, bruises, fractures and tumors, and may be commercially available.

The wormwood extract may be yellow-brown powder with a fineness of 400 mesh, and may have a flavonoid content in a range of approximately >28.6%. The wormwood extract may be an extract of leaves of Artemisia argyi, a Chinese traditional Chinese medicinal material. The wormwood extract may comprise volatile oil, flavonoids, triterpenoids, eucalyptus, trace elements, tannin, polysaccharide and other compounds. The active ingredients may mainly include volatile oil and flavonoids. The wormwood extract may have various pharmacological activities such as antibacterial activity, antiviral activity, sputum removal, relieving cough and asthma, antiallergic activity, anticoagulant activity, complement activation, sedation, cold and pain relief, warming meridian to stop bleeding, and external treatment of skin itching, etc., and may be commercially available.

The snow lotus extract may be an extract of snow lotus herb, and may have a musk sputum content in a range of approximately 6.3-12.2%, a snow lotus lactone content in a range of approximately 0.1-6.8%, an alkaloid content in a range of approximately 0.1-5.0%, a volatile oil content of approximately 2.5%, and a polysaccharide content in a range of approximately 8.5-15.6%. The snow lotus extract may also include flavonoids, coumarins, anthraquinones, and sesquiterpenoids. The snow lotus extract may have various health care functions, and may be commercially available.

The seaweed extract may have a protein content in a range of approximately 51.4-58.3%, a seaweed iodine content in a range of approximately 2.4-9.6%, and a mannitol content in a range of approximately 1.0-10.2%. The seaweed extract may be an extract of Sargassum pallidum (Turn.) C. Ag. or Sargassum S. fusiforme. (Harv.) Setch. in Sargassaceae plant, and may be commercially available. The seaweed extract may also comprise alginic acid, crude protein, multivitamins, enzymes and trace elements. The seaweed extract may have a huge amount of anions, may stimulate fiber cells to produce collagen and elastin, may promote skin metabolism, and may have anti-wrinkle and anti-aging functions. Further, the seaweed extract may improve the hematopoietic function of surface skin and may have the antibacterial use for skin in vitro.

The CMC-Na may have an active ingredient content in a range of approximately ≥99.2% and a pH value of approximately 8.2 in 1% aqueous suspension. The AGE may be allyl glycidyl ether having a CAS No. 106-92-3, and may be purchased from Shanghai Yuhua Chemical Co., Ltd.

The fabrication method of the plant-extract-containing polyester fiber in the present disclosure may mainly include the following.

(1) Chromium sulfate may be added into the organic acid salt under stirring at 95° C. for 12 minutes, then, the mixture may be cooled to 50° C. Moreover, the dispersing machine may be started, and a rotation speed may be adjusted to 800 rad/min to obtain a component A.

(2) Calcium carbide powder, cycloalkyl powder, and halloysite powder may be put into a sanding machine. The sanding machine may be started for grinding at a temperature controlled below 40° C. until the fineness reaches in a range of approximately ≤10 µm. In addition, the AGE, the wetting agent may be added and dispersed for 25 minutes to obtain a component B.

(3) Chitosan with a molecular weight of 200,000 or less may be dissolved in water, and the plant-extract functional additive, the surface active phospholipid, the plasticized starch, CMC-Na, and the antistatic agent with one third of the total weight may be sequentially added. An infrared-ultrasonic treatment may be performed on such mixture to obtain a component C. Parameters of the infrared-ultrasonic treatment may include an ultrasonic frequency of approximately 95 KHz and a treatment duration of approximately 25 minutes.

(4) The polyester chips may be heated to a molten state, then, the component B, the component C, and the component A respectively obtained in (2), (3) and (1) may be sequentially added and mixed. Moreover, the dispersion agent and the remaining antistatic agent may be slowly added under stirring at 1050 rad/min-1100 rad/min for 20 minutes. The plant-extract-containing polyester fiber in the present disclosure may be obtained by a melt spinning method.

Parameters of the melt spinning method may include: a temperature of approximately 272° C., a cooling temperature of side-blowing air of approximately 25° C., a speed of the side-blowing air of approximately 0.6 m/s, a roll spinning speed of approximately 4200 m/min, and a drafting ratio of approximately 4.3. Accordingly, continuous spinning without fine silk may be achieved, which may have a silk rate of approximately 0.0002% and a hard silk rate of approximately 0.0001%, and may have a desired spinnability.

Embodiments 2-6 each provides a plant-extract-containing polyester fiber. The formulation and fabrication method of the plant-extract-containing polyester fiber in Embodiments 2-6 each may be similar or same as that in Embodiment 1, and the difference thereof may include that the weight ratios of the formulations are different, as shown in Table 1.

TABLE 1

|  | Embodiment 2 | Embodiment 3 | Embodiment 4 | Embodiment 5 | Embodiment 6 |
| --- | --- | --- | --- | --- | --- |
| Polyester chips | 290 | 300 | 290 | 290 | 290 |
| Calcium carbide powder | 3 | 4 | 5 | 3 | 4 |
| Cycloalkyl powder | 4 | 6 | 0 | 4 | 4 |
| Halloysite powder | 3 | 5 | 0 | 3 | 3 |
| Plant extracts | 11 | 12 | 11 | 11 | 11 |
| Organic acid salt | 4 | 6 | 4 | 0 | 4 |
| Dispersing agent | 6 | 8 | 6 | 0 | 6 |
| Surface active phospholipid | 10 | 12 | 11 | 10 | 0 |

Embodiment 7

The formulation and weight ratio thereof of a plant-extract-containing polyester fiber in Embodiment 7 may be basically consistent to that in Embodiment 2, while the fabrication method thereof may be different. The fabrication method of the plant-extract-containing polyester fiber in Embodiment 7 may mainly include the following.

(1) Chromium sulfate may be added into the organic acid salt under stirring at 95° C. for 12 minutes, then, the mixture may be cooled to 50° C. Moreover, the dispersing machine may be started, and a rotation speed may be adjusted to 800 rad/min to obtain a component A.

(2) Calcium carbide powder, cycloalkyl powder, and halloysite powder may be put into a sanding machine. The sanding machine may be started for grinding at a temperature controlled below 40° C. until the fineness reaches in a range of approximately ≤10 μm. In addition, the AGE, the wetting agent may be added and dispersed for 25 minutes to obtain a component B.

(3) Chitosan with a molecular weight of 200,000 or less may be dissolved in water, and the plant-extract functional additive, the surface active phospholipid, the plasticized starch, CMC-Na, and the antistatic agent with one third of the total weight may be sequentially added. An ultrasonic treatment may be performed on such mixture to obtain a component C. Parameters of the ultrasonic treatment may include: an ultrasonic frequency of approximately 95 KHz, and a treatment duration of approximately 25 minutes.

(4) The polyester chips may be heated to a molten state, the component B, the component C, and the component A respectively obtained in (2), (3) and (1) may be sequentially added and mixed. Moreover, the dispersion agent and the remaining antistatic agent may be slowly added under stirring at 1050 rad/min -1100 rad/min for 20 minutes. The plant-extract-containing polyester fiber in the present disclosure may be obtained by a melt spinning method.

Parameters of the melt spinning method may include: a temperature of approximately 275° C., a cooling temperature of side-blowing air of approximately 25° C., a speed of the side-blowing air of approximately 0.6 m/s, a roll spinning speed of approximately 3160 m/min, and a drafting ratio of approximately 4.3. In this case, fine silk may be easily produced, a silk rate may be approximately 0.0015%, a hard silk rate may be approximately 0.001%, and the spinnability may be poor.

Performance Indicators of the obtained plant-extract-containing polyester fibers according to the disclosed methods in Embodiments 1-7 may include the following, as shown in Table 2.

TABLE 2

|  | Dry heat shrinkage rate (%) | Breaking strength (cN/dtex) | Elastic modulus (cN/dtex) | Wear resistance (g) | Flame retardancy (s) | LOI value (%) |
| --- | --- | --- | --- | --- | --- | --- |
| Embodiment 1 | 2.6 | 6.2 | 94 | 0.001 | 1.1 | 58 |
| Embodiment 2 | 2.1 | 7.5 | 98 | 0.001 | 0.8 | 65 |
| Embodiment 3 | 2.7 | 6.6 | 98 | 0.002 | 1.2 | 57 |
| Embodiment 4 | 2.5 | 6.8 | 76 | 0.02 | 1.1 | 61 |
| Embodiment 5 | 2.7 | 6.4 | 60 | 0.003 | 1.4 | 56 |
| Embodiment 6 | 2.4 | 6.2 | 72 | 0.005 | 1.0 | 57 |
| Embodiment 7 | 3.6 | 6.7 | 95 | 0.001 | 1.0 | 53 |

The flame retardancy may be determined according to a total burning duration (UL94, vertical burning, 1.6 mm). The LOI value may be detected using the "JISK7201-limiting oxygen index" standard.

Referring to Table 2, each indicator of the plant-extract-containing polyester fiber may meet the normal indicator required for the polyester fiber, and the original product trait may not be changed after being mixed with other functional materials. The polyester fiber in the present disclosure may have a suitable dry heat shrinkage rate, breaking strength and elastic elongation, and may have a significantly improved wear resistance. The polyester fiber in the present disclosure may be non-toxic and non-combustible, may effectively control the spread of fire, and may be safe and environmentally friendly. According to Table 2, the polyester fiber in Embodiment 2 may have the most optimal property.

A lot of experiments and creative labors have been made for the addition amount of each component in the fabrication process of the polyester fiber. Table 1 illustrates some examples to show that the added ingredients and contents thereof in the present disclosure are an unconventional choice and are a non-obvious conclusion obtained by grouping and summarizing after extensive trials. The added ingredients and contents thereof are not limited by the present disclosure, and may be determined according to actual applications.

Natural plant extracts and other functional minerals may be added into the plant-extract-containing polyester fiber in the present disclosure, such that the fabricated fiber may have functions such as antibacterial activity and negative ions release. Table 3 illustrates the functions of the polyester fibers fabricated according to the disclosed methods in the Embodiments 1-7 of the present disclosure.

flame retardancy, i.e., a total burning duration in a range of approximately 0.8 seconds-1.4 seconds; and a LOI value in a range of approximately 57%-65%.

The plant-extract-containing polyester fiber in the present disclosure may have a mite repellent rate in a range of approximately 88.4%-92.1%, a mildew resistance level in a range of approximately 0-2, an antibacterial rate against Escherichia coli in a range of approximately 97.3%-99.5%, an antibacterial rate against Staphylococcus aureus in a range of approximately 96.4%-99.9%, and desired persistence of negative ions generation.

The plant-extract-containing polyester fiber in the present disclosure may have a long-lasting effect and an improved uniformity of negative ions generation. After 50 times of conventional water washing, the negative oxygen ions generation rate may be in a range of approximately 83.1%-94.2%.

During the fabrication process of the plant-extract-containing polyester fiber in Embodiment 7, because the ultrasonic treatment is performed and the spinning process is changed, the dry heat shrinkage rate of the fabricated plant-extract-containing polyester fiber may have a big change.

TABLE 3

|  | Mite repellent rate (%) | Mildew resistance level | Antibacterial rate against Escherichia coli (%) | Antibacterial rate against Staphylococcus aureus (%) | Negative ions generation rate (%) |
| --- | --- | --- | --- | --- | --- |
| Embodiment 1 | 91.5 | 1 | 98.7 | 98.5 | 86.5 |
| Embodiment 2 | 92.1 | 0 | 99.5 | 97.8 | 94.2 |
| Embodiment 3 | 88.6 | 1 | 99.1 | 98.3 | 85.0 |
| Embodiment 4 | 91.2 | 1 | 98.8 | 99.9 | 83.1 |
| Embodiment 5 | 87.7 | 1 | 99.2 | 98.1 | 84.5 |
| Embodiment 6 | 89.5 | 2 | 97.3 | 97.2 | 84.6 |
| Embodiment 7 | 88.4 | 1 | 98.5 | 96.4 | 85.1 |

Antibacterial rate may be detected according to GB/T20944.3-2008 textile antibacterial performance method, i.e., oscillation method. Mildew resistance detection standard may use GBT 24346-2009 textile mildew resistance performance evaluation. Mite repellent rate detection standard may use GBT 24253-2009 textile mite repellent performance evaluation.

According to Table 3, the plant-extract-containing polyester fibers fabricated according to disclosed methods in Embodiments 1-7 may have desired bacteriostatic and antibacterial performance, desired mite repellent performance, and desired persistence of negative ions generation.

Referring to Tables 2-3, the plant-extract-containing polyester fiber in the present disclosure may have the following properties: a dry heat shrinkage rate in a range of approximately 2.1%-3.3%; a breaking strength in a range of approximately 6.2 cN/dtex -7.5 cN/dtex; a high wear resistance, i.e., a loss in a range of approximately 0.001 g/cm$^2$-0.002 g/cm$^2$ after being tested 2000 times by a wear-resistant reciprocating test machine; desired fire resistance and strong In addition, compared with a commercially available plant-extract-containing polyester fiber, the plant-extract-containing polyester fiber in the present disclosure may have features such as a higher surface flatness, a desired glossiness, a color fastness in a range of approximately above 4, a desired water vapor diffusivity, easy release of condensate, easy release of moisture, quick dry, a desired hygroscopicity for daily wear, and being comfortable without generating static electricity.

The functional characteristics e.g., mildew resistance, antibacterial performance, etc., of the plant-extract-containing polyester fiber in the present disclosure may be mainly determined by the contents of the added plant extracts. Table 4 illustrates the functional characteristics of the polyester fibers fabricated according to the method in Embodiment 2 as a function of ratios of grass coral extract, wormwood extract, snow lotus extract, and seaweed extract in the plant extracts.

TABLE 4

| Ratios of grass coral extract, wormwood extract, snow lotus extract, and seaweed extract in the plant extracts | Mite repellent rate (%) | Mildew resistance level | Antibacterial rate against Escherichia coli (%) | Antibacterial rate against Staphylococcus aureus (%) |
| --- | --- | --- | --- | --- |
| 5:1:1:2 (Embodiment 2) | 92.1 | 0 | 99.5 | 97.8 |
| 3:1:1:2 | 88.6 | 1 | 99.4 | 97.1 |

TABLE 4-continued

| Ratios of grass coral extract, wormwood extract, snow lotus extract, and seaweed extract in the plant extracts | Mite repellent rate (%) | Mildew resistance level | Antibacterial rate against *Escherichia coli* (%) | Antibacterial rate against *Staphylococcus aureus* (%) |
| --- | --- | --- | --- | --- |
| 4:1:1:2 | 88.7 | 1 | 94.6 | 95.6 |
| 6:1:1:2 | 92.1 | 0 | 92.5 | 91.8 |
| 5:2:1:2 | 91.6 | 0 | 94.7 | 95.1 |
| 5:1:2:2 | 91.5 | 1 | 97.4 | 94.9 |
| 5:1:1:3 | 91.8 | 1 | 93.6 | 94.5 |

Table 4 illustrates some examples to show that special ratios of grass coral extract, wormwood extract, snow lotus extract, and seaweed extract in the plant extracts in the present disclosure are an unconventional choice and are a non-obvious conclusion obtained by grouping and summarizing after extensive trials.

The performance indicators of the plant-extract-containing polyester fibers fabricated according to methods in Embodiments 1-7 may be tested by weaving the plant-extract-containing polyester fibers in the present disclosure into a warp and weft 68D/24F FDY full-polyester semi-gloss plain fabric, 190T. The negative ions generation amount and high temperature resistance may be determined using the national standard "GBT30128-2013 Textile Testing and Evaluation for Negative Ions Generation", as shown in Table 5.

TABLE 5

| | Negative ions generation amount (pieces/cm³) | Negative ions generation amount (pieces/cm³) after a high temperature (100° C., 5 h) treatment |
| --- | --- | --- |
| Embodiment 1 | 2579 | 2533 |
| Embodiment 2 | 2645 | 2642 |
| Embodiment 3 | 2621 | 2577 |
| Embodiment 4 | 2594 | 2479 |
| Embodiment 5 | 2615 | 2566 |
| Embodiment 6 | 2642 | 2612 |
| Embodiment 7 | 2638 | 1026 |

Referring to Table 5, the plant-extract-containing polyester fiber in the present disclosure may effectively release negative ions, and, thus, may purify air, infiltrate human skin, calm the human emotion, and enhance people's resistance to disease. Further, the performance of the polyester fiber fabricated according to the disclosed methods in the present disclosure may not be easily changed after being treated at a high temperature, and, thus, the release performance of negative ions may not be affected.

Comparing the data in Embodiments 2 and 7 shows that in the case where the other processes are basically consistent, especially in the case where the addition amount of the calcium carbide powder is consistent, the plant-extract-containing polyester fiber fabricated according to the method in Embodiment 7 may have a significant drop in the negative ions generation amount after being treated at a high temperature.

Embodiment 8

The plant-extract functional additive may determine the functional characteristics of the plant-extract-containing polyester fibers in the present disclosure. Table 6 illustrates the functional characteristics of the plant-extract-containing polyester fibers fabricated by directly replacing the plant-extract functional additive in the Embodiments 1-7 with the plant extracts without changing other technical solutions.

TABLE 6

| | Dry heat shrinkage rate (%) | Breaking strength (cN/dtex) | Elastic modulus (cN/dtex) | Wear resistance (g) | Flame retardancy (s) |
| --- | --- | --- | --- | --- | --- |
| Embodiment 9 | 2.7 | 4.2 | 95 | 0.021 | 2.5 |
| Embodiment 10 | 2.2 | 5.8 | 92 | 0.022 | 2.1 |
| Embodiment 11 | 2.6 | 4.9 | 96 | 0.026 | 2.7 |
| Embodiment 12 | 2.7 | 4.8 | 78 | 0.034 | 2.5 |
| Embodiment 13 | 2.3 | 4.7 | 65 | 0.015 | 2.1 |
| Embodiment 14 | 2.6 | 4.6 | 77 | 0.022 | 2.3 |
| Embodiment 15 | 3.3 | 4.9 | 93 | 0.019 | 2.4 |

Referring to Table 6, breaking strength and wear resistance of the plant-extract-containing polyester fibers fabricated by directly replacing the plant-extract functional additive in the Embodiments 1-7 with the plant extracts without changing other fabrication processes may be significantly reduced, and the dry heat shrinkage rate, elastic modulus and flame retardancy thereof may be reduced to some extent. In general, the comprehensive performance of the fabricated polyester fiber without using the plant-extract functional additive may be significantly reduced.

The above detailed descriptions only illustrate certain exemplary embodiments of the present disclosure, and are not intended to limit the scope of the present disclosure. Those skilled in the art can understand the specification as whole and technical features in the various embodiments can be combined into other embodiments understandable to those persons of ordinary skill in the art. Any equivalent or modification thereof, without departing from the spirit and principle of the present disclosure, falls within the true scope of the present disclosure.

What is claimed is:

1. A plant-extract-containing polyester fiber, comprising:
raw materials including 280-300 parts of polyester chips, 3-7 parts of calcium carbide powder, 2-6 parts of cycloalkyl powder, 2-5 parts of halloysite powder, 10-12 parts of plant-extract functional additive, 8 parts of allyl glycidyl ether, 2-6 parts of organic acid salt, 0.2 parts of chromium sulfate, 4-8 parts of dispersing agent, 9-12 parts of surface active phospholipid, 8 parts of plasticized starch, 10 parts of chitosan, 10 parts of wetting agent, 24 parts of sodium salt of caboxy methyl cellulose, and 12 parts of antistatic agent.

2. The polyester fiber according to claim 1, wherein:
the plant-extract-containing polyester fiber comprises raw materials including 290 parts of polyester chips, 3 parts of calcium carbide powder, 4 parts of cycloalkyl powder, 3 parts of halloysite powder, 11 parts of plant-extract functional additive, 4 parts of organic acid salt, 6 parts of dispersing agent, 10 parts of surface active phospholipid.

3. The polyester fiber according to claim 2, wherein:
the plant-extract functional additive comprises plant extracts; and
the plant extracts include a grass coral extract, a wormwood extract, a snow lotus extract, and a seaweed extract with a weight ratio of approximately 5:1:1:2.

4. The polyester fiber according to claim 3, wherein:
the grass coral extract has a fiber content in a range of approximately ≤5.8% and an isofraxiden content of approximately 2.8%;
the wormwood extract is yellow-brown powder with a fineness of 400 mesh, and has a flavonoid content in a range of approximately >28.6%;
the snow lotus extract is an extract of snow lotus herb, and has a musk sputum content in a range of approximately 6.3-12.2%, a snow lotus lactone content in a range of approximately 0.1-6.8%, an alkaloid content in a range of approximately 0.1-5.0%, a volatile oil content of approximately 2.5%, and a polysaccharide content in a range of approximately 8.5-15.6%;
the seaweed extract has a protein content in a range of approximately 51.4-58.3%, a seaweed iodine content in a range of approximately 2.4-9.6%, and a mannitol content in a range of approximately 1.0-10.2%; and
the sodium salt of caboxy methyl cellulose has an active ingredient content in a range of approximately ≥99.2%, and a pH value of approximately 8.2 in 1% aqueous suspension.

5. The polyester fiber according to claim 2, wherein the plant-extract functional additive is prepared including:
dissolving lignin in sodium hydroxide solution under stirring for 12-16 minutes to be well mixed,
adding glacial acetic acid until a pH value is adjusted to 2-3,
adding laccase and lignin peroxidase under stirring for 3-8 minutes,
raising a temperature to 30° C.-40° C. and keeping for 10 minutes-20 minutes,
adjusting the pH value to 1-2 by adding the glacial acetic acid,
adding ethylene diamine, and
heating in a water bath for undergoing reaction for 100 minutes-150 minutes;
after the reaction is completed, adjusting the pH value to 4-5 using sodium hydroxide,
adding the plant extracts according to a weight ratio,
mixing the plant extracts using a stirrer, and
performing an ultrasonic treatment twice to evenly disperse the plant extracts, wherein a duration of a first ultrasonic treatment is approximately 20 minutes-25 minutes, a first ultrasonic frequency is approximately 50 kHz-100 kHz, a duration of a second ultrasonic treatment is approximately 45 minutes-60 minutes, and a second ultrasonic frequency is approximately 100 kHz-120 kHz; and
after the dispersion is completed, adding ammonium cerium nitrate,
raising the temperature to 80° C.-85° C. to continue the reaction for 50 minutes-120 minutes, and
washing, purifying and vacuum drying the reactant to obtain the plant-extract functional additive.

6. The polyester fiber according to claim 5, wherein:
an addition amount of the lignin is approximately 5-20% by weight of the plant-extract functional additive,
an addition amount of the plant extracts is approximately 70-120% by weight of the lignin,
an addition amount of the laccase is approximately 1.3-1.5% by weight of the lignin,
an addition amount of the lignin peroxidase is approximately 0.7-1.5% by weight of the lignin,
an addition amount of the ammonium cerium nitrate is approximately 0.7-2.5% by weight of the plant extracts,
an addition amount of the ethylene diamine is approximately 150-200% by weight of the lignin, and
a temperature of the water bath is approximately 65° C.-75° C.

7. The polyester fiber according to claim 2, wherein:
the organic acid salt comprises sodium acetylsalicylate, sodium humate, and zinc glucosamine with a weight ratio of approximately 3:1:4,
the wetting agent is a polyether-modified polydimethylsiloxane interpolymer solution with a weight percent concentration of approximately 22% in xylene solvent,
the surface active phospholipid has a colour and lustre in a range of approximately <10, a pH value in a range of approximately 5.0-7.2 in 10% aqueous solution, and a solid content of approximately 41.0±1.2%, and
the cycloalkyl powder comprises materials in percentage by weight: $Al_2O_3$ in a range of approximately 68.06-69.00%, $SiO_2$ in a range of approximately 16.03-17.22%, $K_2O$ of approximately 1.07%, $Na_2O$ of approximately 10.06%, and $Fe_2O_3$ of approximately 0.77%.

8. The polyester fiber according to claim 1, wherein the polyester fiber is prepared including:
adding chromium sulfate into organic acid salt under stirring at 95° C. for 12 minutes,
cooling to 50° C., and
staring a dispersing machine and adjusting a rotation speed to 800 rad/min to obtain a component A;
putting calcium carbide powder, cycloalkyl powder, and halloysite powder into a sanding machine,
starting the sanding machine for grinding at a temperature controlled below 40° C. until the fineness reaches in a range of approximately ≤10 82 m, and
adding AGE, wetting agent and dispersing for 25 minutes to obtain a component B;
dissolving chitosan with a molecular weight of 200,000 or less in water,
sequentially adding plant-extract functional additive, surface active phospholipid, plasticized starch, sodium salt of caboxy methyl cellulose, and antistatic agent with one third of the total weight, and
performing an infrared-ultrasonic treatment on such mixture to obtain a component C;
heating polyester chips to a molten state,
sequentially adding the component B, the component C, and the component A, and mixing,
sequentially and slowly adding dispersion agent and remaining antistatic agent under stirring at 1050 rad/min-1100 rad/min for 20 minutes, and
using a melt spinning method to obtain the plant-extract-containing polyester fiber.

9. The polyester fiber according to claim 8, wherein parameters of the infrared-ultrasonic treatment include:
an ultrasonic frequency of approximately 95 KHz, and
a treatment duration of approximately 25 minutes.

10. The polyester fiber according to claim 8, wherein parameters of the melt spinning method include:
- a temperature of approximately 272° C.,
- a cooling temperature of side-blowing air of approximately 25° C.,
- a speed of the side-blowing air of approximately 0.6 m/s,
- a roll spinning speed of approximately 4200 m/min, and
- a drafting ratio of approximately 4.3.

* * * * *